(12) United States Patent
Hiramatsu

(10) Patent No.: US 12,344,067 B2
(45) Date of Patent: Jul. 1, 2025

(54) ARM MEMBER AND METHOD OF MANUFACTURING ARM MEMBER

(71) Applicant: SOMIC MANAGEMENT HOLDINGS INC., Tokyo (JP)

(72) Inventor: Katsuhiro Hiramatsu, Tokyo (JP)

(73) Assignee: SOMIC MANAGEMENT HOLDINGS INC., Tokyo (JP)

( * ) Notice: Subject to any disclaimer, the term of this patent is extended or adjusted under 35 U.S.C. 154(b) by 0 days.

(21) Appl. No.: 18/285,407

(22) PCT Filed: Jan. 27, 2022

(86) PCT No.: PCT/JP2022/003061
§ 371 (c)(1),
(2) Date: Oct. 3, 2023

(87) PCT Pub. No.: WO2022/239311
PCT Pub. Date: Nov. 17, 2022

(65) Prior Publication Data
US 2024/0109381 A1  Apr. 4, 2024

(30) Foreign Application Priority Data
May 14, 2021  (JP) .................................. 2021-082412

(51) Int. Cl.
*B60G 7/00* (2006.01)

(52) U.S. Cl.
CPC ............. *B60G 7/005* (2013.01); *B60G 7/001* (2013.01)

(58) Field of Classification Search
CPC ..... B23P 11/00; B23P 11/005; B23P 2700/11; B60G 7/00; B60G 7/001; B60G 7/005;
(Continued)

(56) References Cited

U.S. PATENT DOCUMENTS

| 6,109,816 A | 8/2000 | Iwasaki |
| 10,377,418 B2 | 8/2019 | Sakuma |

(Continued)

FOREIGN PATENT DOCUMENTS

| EP | 411777 A | * | 2/1991 | .......... F16C 11/0657 |
| JP | 04-035008 U1 | | 3/1992 | |

(Continued)

OTHER PUBLICATIONS

Description Translation for JP H0435008 from PE2E Search (Year: 1992).*

(Continued)

*Primary Examiner* — Jason D Shanske
*Assistant Examiner* — Daniel M. Keck
(74) *Attorney, Agent, or Firm* — TROUTMAN PEPPER LOCKE LLP

(57) ABSTRACT

An arm member and a method of manufacturing the arm member capable of ensuring strength in holding a ball part using a swaged part of a housing. An arm member includes a ball joint and an arm part. The ball joint has a ball stud including a ball part. The ball joint has a housing including a swaged part and holds the ball part inside the housing using deformation of the swaged part. The arm part has an arm part body made of discontinuous fiber-reinforced resin and continuous with the housing. The arm part has a covering part made of continuous fiber-reinforced resin and covering at least a part of the swaged part.

4 Claims, 2 Drawing Sheets

(58) Field of Classification Search
CPC ...... B60G 7/02; B60G 2204/416; B60G 2206/11; B60G 2206/122; B60G 2206/124; B60G 2206/7101; F16C 11/06; F16C 2326/05
USPC .................................................. 280/124.134
See application file for complete search history.

(56) References Cited

U.S. PATENT DOCUMENTS

| | | | |
|---|---|---|---|
| 10,576,802 B2 | 3/2020 | Takashi | |
| 10,850,589 B2 * | 12/2020 | Ohmura | B60G 7/005 |
| 2020/0191194 A1 * | 6/2020 | Gruber | F16C 11/0685 |
| 2020/0231014 A1 * | 7/2020 | Tanaka | B60G 7/001 |
| 2023/0060485 A1 * | 3/2023 | Chila | F16C 11/0657 |

FOREIGN PATENT DOCUMENTS

| | | |
|---|---|---|
| JP | H10151931 A | 6/1998 |
| JP | 2016075333 A | 5/2016 |
| JP | 2017128244 A | 7/2017 |
| JP | 6408851 B2 | 10/2018 |
| JP | 2018176916 A | 11/2018 |
| WO | WO-2017135743 A1 * 8/2017 ........... B29C 43/003 |

OTHER PUBLICATIONS

Description Translation for JP 2016/075333 from Espacenet (Year: 2016).*

International Search Report issued in International Application No. PCT/JP2022/003061 on Mar. 29, 2022.

* cited by examiner

ARM MEMBER AND METHOD OF MANUFACTURING ARM MEMBER

CROSS-REFERENCE TO RELATED APPLICATIONS

This application is a U.S. National Phase of International Patent Application No. PCT/JP2022/003061, filed on Jan. 27, 2022, which published as WO 2022/239311 A1 on Nov. 17, 2022, and claims priority to JP 2021-082412, filed on May 14, 2021, all of which are herein incorporated by reference in their entireties.

TECHNICAL FIELD

This invention relates to an arm member including a ball joint having a receiving-side member including a swaged part, and an arm part formed continuously with the receiving-side member, and to a method of manufacturing the arm member.

BACKGROUND

In some cases, in a steering device or a suspension device of a vehicle such as an automobile, a part partially formed by using fiber-reinforced resin (FRP) is used for the purpose of weight saving.

For example, there exists a suspension arm formed by hot press on discontinuous fiber-reinforced resin (randomly chopped material). To ensure strength in such a suspension arm, the amount of usage of the discontinuous fiber-reinforced resin must be increased. In this case, a problem of failing to encourage weight saving is eventually caused. In response to this, according to a known technique, both strength increase and weight saving are achieved by providing continuous fiber-reinforced resin on a surface of the discontinuous fiber-reinforced resin (see Japanese Patent Publication No. 6408851 (pp. 5 to 8, FIG. 6), for example).

SUMMARY

In the case of a suspension arm such as that described in—Japanese Patent Publication No. 6408851 (pp. 5 to 8, FIG. 6) mentioned above, a ball joint is provided at an end portion of an arm part. If the ball joint is to rotatably hold a ball part while the ball part is housed inside a housing as a receiving-side member by swaging and shaping a part of the housing, it is required to prevent coming-off of the ball part from the housing to be caused if the swaged part is opened with load input from the outside to the ball part. This problem also occurs at an arm member other than the suspension arm.

This invention has been made in mind of the foregoing issue, and is intended to provide an arm member and a method of manufacturing the arm member capable of ensuring strength in holding a ball part using a swaged part of a receiving-side member.

An arm member as recited below includes: a ball joint having a ball-side member including a ball part, and a receiving-side member including a swaged part and holding the ball part inside the receiving-side member using deformation of the swaged part; and an arm part having an arm part body made of discontinuous fiber-reinforced resin and continuous with the receiving-side member, and a covering part made of continuous fiber-reinforced resin and covering at least a part of the swaged part.

According to an arm member as recited below, in the arm member as recited, the receiving-side member further includes a cylindrical receiving-side member body part and a closing member covering the receiving-side member body part at one end portion side thereof, and the swaged part is formed at the receiving-side member body part at the one end portion side and is swaged and formed to fix the closing member to the receiving-side member body part.

According to an arm member as recited below, the covering part covers at least a part of a surface of the arm part body next to the swaged part.

A method of manufacturing an arm member as recited below is a method of manufacturing an arm member by which the arm member as recited is manufactured, including: a swaging step of swaging and shaping the swaged part while the ball part is inserted in the receiving-side member to hold the ball part inside the receiving-side member; and a forming step of performing hot press forming on the discontinuous fiber-reinforced resin and the continuous fiber-reinforced resin to form the arm part body and the covering part after the swaging step.

Advantageous Effects of Invention

According to the arm member, in response to load input from the outside to the ball part, the strength of the covering part acts as resistance against reset of the deformation of the swaged part. Thus, it becomes possible to ensure the strength of the swaged part of the receiving-side member.

In addition to the effect fulfilled by the arm member as recited, coming-off of the closing member from the receiving-side member body part is prevented using the covering part, thereby allowing the ball part to be held reliably inside the receiving-side member.

In addition to the effect fulfilled by the arm member, providing the covering part continuously over a range from the arm part body to the swaged part makes it possible to increase the strength of the covering part against load input from the outside to the ball part. As a result, strength in holding the ball part using the swaged part of the receiving-side member can be increased.

According to the method of manufacturing, the forming step of forming the arm part body and the covering part is prevented from being hindered by the swaging step of swaging and shaping the swaged part, making it possible to easily form the covering part covering at least a part of the swaged part.

DETAILED DESCRIPTION

Figure 1:
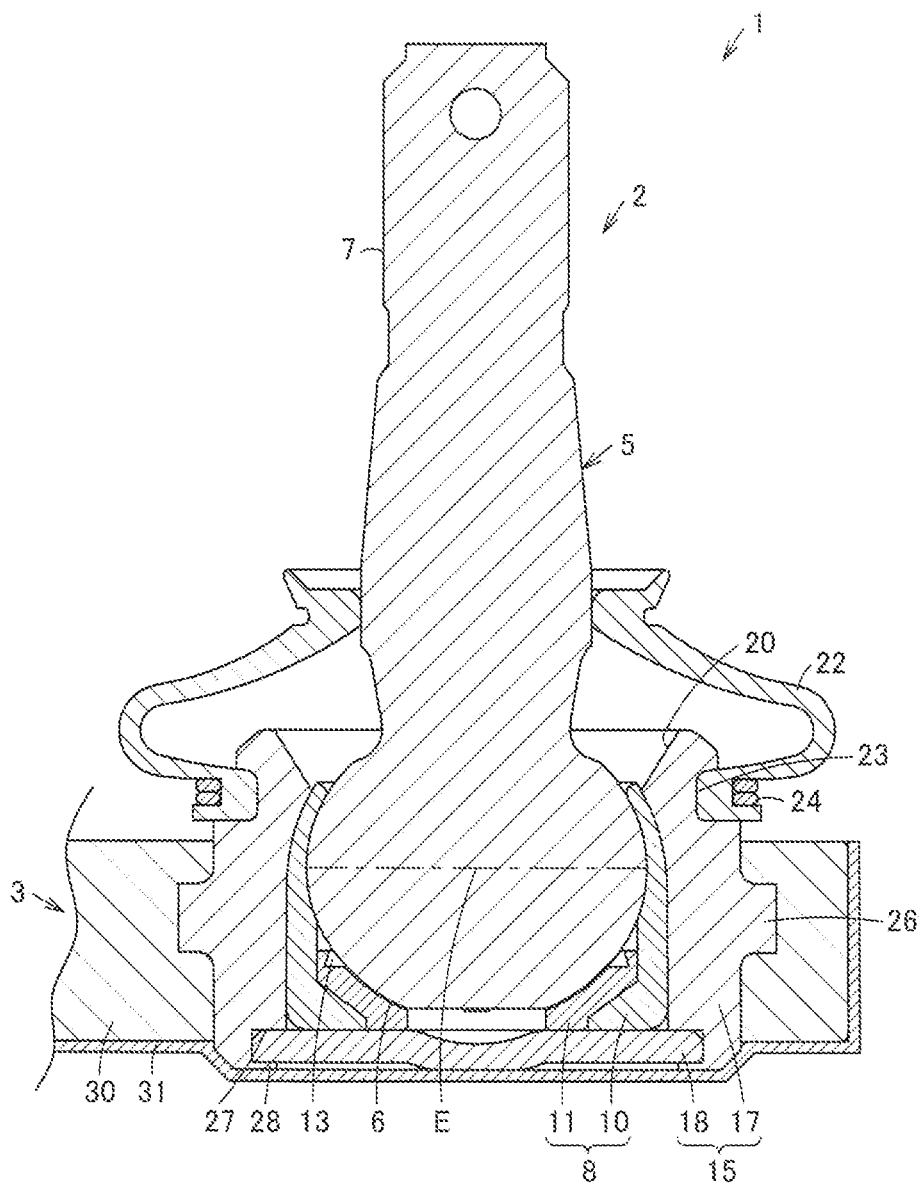
FIG. 1 is a partial sectional view showing an arm member according to an embodiment of this invention.

An embodiment of this invention is described below by referring to the drawings.

Figure 2A:
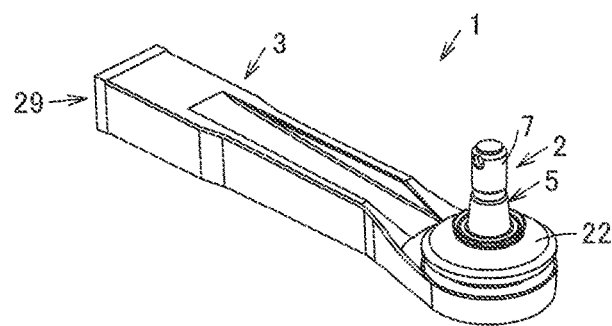
FIG. 2A is a perspective view showing an example of the arm member.
Figure 2B:
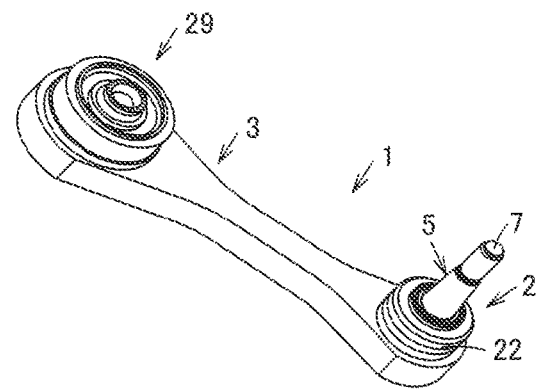
FIG. 2B is a perspective view showing another example of the arm member.
Figure 2C:
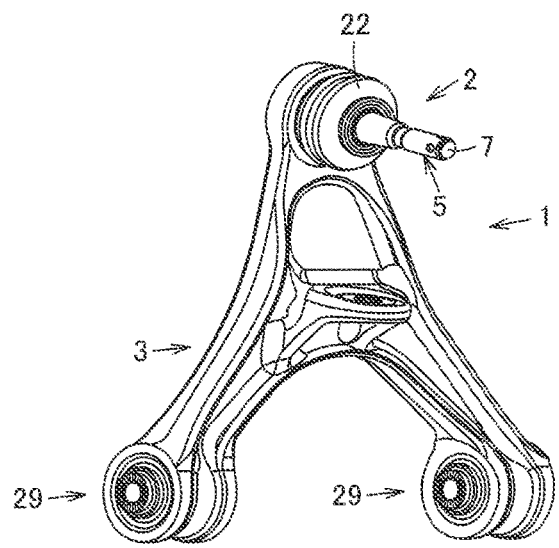
FIG. 2C is a perspective view showing still another example of the arm member.
Figure 2D:
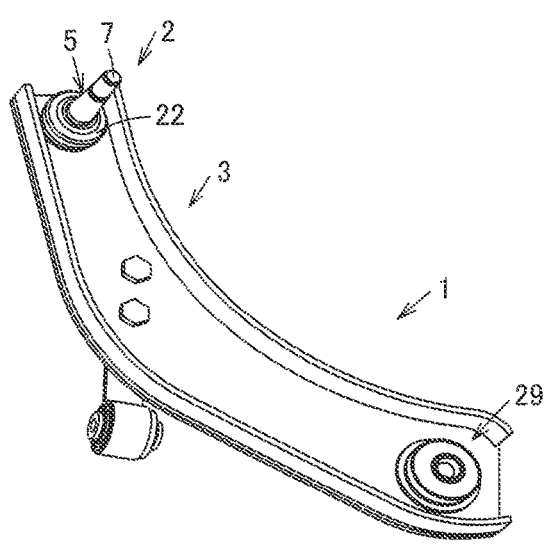
FIG. 2D is a perspective view showing still another example of the arm member.

Referring to FIG. 1, a reference number 1 denotes an arm member. In this embodiment, the arm member 1 is an arm member for a vehicle used in a steering device or a suspension device of an automobile, for example. The arm member 1 is a ball joint unit including a ball joint 2 and an arm part 3 formed integrally with the ball joint 2. While the arm member 1 may be an arbitrary member, it is preferably used as a tie-rod end shown in FIG. 2A, as a linear multilink suspension arm also called an I arm and the like shown in FIG. 2B, as an upper arm or a lower arm of a double wishbone suspension shown in FIG. 2C, or as a lower arm of a MacPherson strut suspension shown in FIG. 2D, and the like, for example.

As shown in FIG. 1, the ball joint 2 includes a ball stud 5 as a ball-side member. The ball stud 5 is formed into a shaft-like shape using steel and the like, for example. The ball stud 5 has a ball part 6 formed at one end portion thereof, and a stud part 7 projecting in a shaft-like shape (circular columnar shape) from the ball part 6 toward an opposite end portion thereof. The stud part 7 is connected to an external connection target member not shown in the drawings. In the following, for clarity of the explanation, a side closer to the ball part 6 is shown as a one-end side or a lower side and a side closer to the stud part 7 is shown as an opposite-end side or an upper side in this embodiment. Meanwhile, a vertical direction in the arm member 1 is appropriately settable in response to an orientation or an angle of installation of the arm member 1.

The ball part 6 is rotatably held by a bearing sheet 8 as a sliding member. The bearing sheet 8 is formed into a circular cylindrical shape using synthetic resin. In this embodiment, the bearing sheet 8 has a two-piece configuration. Specifically, the bearing sheet 8 shown in the drawing has a first sheet member 10 and a second sheet member 11. The first sheet member 10 rotatably holds the ball part 6 in a range extending toward the upper side from an equator position E of the ball part 6. Here, the equator position E of the ball part 6 is a position where the diameter of the ball part 6 is maximum as viewed in an axis direction of the ball stud 5. The second sheet member 11 is internally fitted in a lower end portion side of the first sheet member 10. The second sheet member 11 rotatably holds the ball part 6 in a range on the lower side relative to the equator position E of the ball part 6. In the example shown in the drawing, the second sheet member 11 is provided with a storage 13 like a recess for a lubricant formed at a position on an inner periphery side facing an outer peripheral surface of the ball part 6.

The bearing sheet 8 is housed together with the ball part 6 in a housing 15 as a receiving-side member. The housing 15 is also called a socket and the like, and is a metallic member formed by forging or casting, for example. In this embodiment, the housing 15 has a housing body part 17 as a circular cylindrical receiving-side member body part, and a plug 18 as a closing member closing an end portion of the housing body part 17. By the presence of the housing body part 17 and the plug 18, the bearing sheet 8 is fitted to the interior of the housing 15 to form an inner chamber for housing and holding the bearing sheet 8.

The housing body part 17 is formed into a straight circular cylindrical shape having a constant or substantially constant inner diameter dimension and a constant or substantially constant outer diameter dimension. The housing body part 17 is opened at opposite end portions including a lower end portion closed by the plug 18 and an upper end portion functioning as an opening part 20 communicating with the inner chamber. The stud part 7 of the ball stud 5 projects upward from the opening part 20. The housing body part 17 has an inner peripheral surface reduced in diameter gradually toward the opening part 20. The opening part 20 is expanded upward.

The opening part 20 is covered by a dust cover 22. The dust cover 22 is formed into a circular cylindrical shape using an elastic member. The dust cover 22 is attached to both an outer peripheral surface of the housing body part 17 and the stud part 7 of the ball stud 5. The dust cover 22 has a lower end portion fixed to the housing body part 17 and an upper end portion contacting an outer peripheral surface of the stud part 7 under pressure. In the example shown in the drawing, the lower end portion of the dust cover 22 is fitted in an attachment groove 23 formed at the outer peripheral surface of the housing body part 17 and is fastened and fixed to the attachment groove 23 with a clip 24 as a fixing member having a shape like a circular ring. In this embodiment, the attachment groove 23 is formed at a position closer to an upper end portion of the outer peripheral surface of the housing body part 17.

A retainer 26 for increasing an area of contact with the arm part 3 is formed at the outer peripheral surface of the housing body part 17. The retainer 26 is formed into a step-like shape. In this embodiment, the retainer 26 is formed as a projection projecting outward from the outer peripheral surface of the housing body part 17. In the example shown in the drawing, the retainer 26 is located at a central portion of the housing body part 17 as viewed in the vertical direction, which is an axis direction of the housing body part 17.

The plug 18 forms a bottom of the housing 15. The plug 18 closes the lower end portion of the housing body part 17, thereby holding the bearing sheet 8 inside the housing 15. The plug 18 is a part located at a position facing the ball part 6 in the axis direction across the bearing sheet 8 and to receive the largest load at the housing 15 applied from the ball stud 5 side.

The plug 18 is formed into a circular ring-like or circular plate-like (circular disk-like) shape. In this embodiment, the plug 18 is recessed downward at a central portion thereof. A lower end portion of the bearing sheet 8 abuts on the plug 18. In this embodiment, respective lower end portions of the first sheet member 10 and the second sheet member 11 abut on the plug 18.

The plug 18 has an outer edge supported by a support 27 formed at the lower end portion side of the housing body part 17. The support 27 is formed into a groove shape at the inner peripheral surface of the housing body part 17 (inner chamber). The support 27 is formed continuously from a peripheral direction of the housing body part 17. Furthermore, the plug 18 is held by and fixed to the housing body part 17 by swaging and deformation of a swaged part 28. The swaged part 28 is formed at the lower end portion of the housing body part 17 and in proximity to the support 27. The swaged part 28 is swaged and formed toward a center axis, thereby interposing the outer edge of the plug 18 between the swaged part 28 and the support 27 from above and below.

At the time of formation of the housing body part 17, the swaged part 28 is not formed but extends in the axis direction of the housing body part 17. In fixing the plug 18 to the housing body part 17, the swaged part 28 is swaged and formed in such a manner as to collapse toward the center axis of the housing body part 17.

The arm part 3 is formed integrally with the housing 15. The arm part 3 is formed using synthetic resin, which is fiber-reinforced resin in this embodiment. The arm part 3 extends in an elongated shape in an axis-perpendicular direction from the housing 15. In this embodiment, the ball joint 2 is formed at one end portion of the arm part 3 in a lengthwise direction thereof. As shown in FIGS. 2A to 2D, a connection 29 such as a female thread or a bush may be formed at an opposite end portion of the arm part 3 in the lengthwise direction thereof.

As shown in FIG. 1, the arm part 3 has an arm part body 30 continuous with the housing 15. The arm part body 30 is formed in such a manner as to cover a range of a predetermined vertical width including a central portion of the outer peripheral surface of the housing body part 17 of the housing 15 as viewed in the axis direction, namely, in the vertical direction. In this embodiment, the arm part body 30 is formed in such a manner as to cover a range of a predetermined vertical width including the retainer 26 of the housing body part 17. The swaged part 28 projects downward relative to a lower portion of the arm part body 30. The housing body part 17 projects upward at the upper end portion side thereof including the attachment groove 23 relative to an upper portion of the arm part body 30. Specifically, both the opposite end portions of the housing 15 of the ball joint 2 project relative to the arm part body 30.

The arm part body 30 is made of discontinuous fiber-reinforced resin. In this embodiment, the discontinuous fiber-reinforced resin is thermoplastic resin containing discontinuous fiber. The discontinuous fiber means chopped fiber formed by cutting continuous fiber into a predetermined length. As an example, discontinuous carbon fiber is preferably used as the discontinuous fiber.

A covering part 31 is formed integrally with the arm part body 30. The covering part 31 is formed into a layer shape having a smaller thickness in the vertical direction than the arm part body 30. The covering part 31 covers at least a part of the swaged part 28 of the housing 15. Specifically, the covering part 31 of this embodiment is located at the lower portion of the arm part body 30. In this embodiment, the covering part 31 continuously covers at least a part of the swaged part 28 and at least a part of a surface of the lower portion of the arm part body 30 next to the swaged part 28. Preferably, the covering part 31 continuously covers the swaged part 28 in its entirety, at least a part of the plug 18, and the surface of the lower portion of the arm part body 30. In the example shown in the drawing, the covering part 31 continuously covers a lower surface of the plug 18 including the swaged part 28 in its entirety, and the surface of the lower portion in its entirety and a side surface in its entirety of the arm part body 30. Specifically, the covering part 31 of this embodiment continuously covers the arm part body 30 over its entire surface except an upper surface thereof.

The covering part 31 is made of sheet-like continuous fiber-reinforced resin (prepreg). The continuous fiber-reinforced resin is formed into a sheet-like shape in advance by impregnating continuous fiber with thermoplastic resin. The continuous fiber may be a unidirectional material (UD prepreg) arranged in such a manner as to extend continuously in one predetermined direction or may be a cloth material (cloth prepreg) arranged in such a manner as to extend continuously in two predetermined directions intersecting with each other. Continuous carbon fiber is preferably used as the continuous fiber, for example.

A method of manufacturing the arm member 1 will be described next.

For manufacturing the arm member 1, the ball joint 2 is assembled first. The ball joint 2 is arranged in such a manner that the bearing sheet 8 rotatably holding the ball part 6 is arranged inside the housing 15 (arranging step). In the arranging step, the bearing sheet 8 may be formed in advance and attached to the outer peripheral surface of the ball part 6. Alternatively, the bearing sheet 8 may be formed by injection molding using the ball part 6 as a core. Regarding the housing 15, the housing body part 17 may be formed in advance and the ball part 6 and the bearing sheet 8 may be incorporated into the housing body part 17, or the housing body part 17 may be cast using the ball part 6 and the bearing sheet 8 as a core. The stud part 7 may be formed in advance integrally with the ball part 6 or may be connected to the ball part 6 in a subsequent step such as welding.

Next, the plug 18 is placed at the support 27 of the housing body part 17 and the swaged part 28 is formed by swaging and deformation, thereby retaining and fixing the plug 18 to the housing body part 17 (swaging step).

Then, the housing 15 with the swaged part 28 resulting from the swaging and deformation is placed in a forming die. Furthermore, discontinuous fiber-reinforced resin and continuous fiber-reinforced resin are placed in the forming die. Then, heat and pressure are applied, thereby forming the arm part 3 through hot press into a predetermined shape covering at least a part of the swaged part 28 (forming step). If the arm member 1 is to have the connection 29 such as a bush, such a bush is also placed in the forming die during placement of the housing 15 in the forming die.

Then, the dust cover 22 is attached over a range from the housing 15 to the stud part 7, and is fastened and fixed with the clip 24 (attaching step), thereby completing formation of the arm member 1.

In the arm member 1 manufactured in this way, the arm part 3 is composed of the arm part body 30 made of discontinuous fiber-reinforced resin and the covering part 31 made of continuous fiber-reinforced resin, and the covering part 31 covers at least a part of the swaged part 28. By doing so, in response to load input from the outside to the ball part 6 and acting downward, namely, acting to reset the swaging and deformation of the swaged part 28, the strength (tensile strength) of the covering part 31 acts as resistance against the reset of the deformation of the swaged part 28. Thus, it becomes possible to ensure strength in holding the ball part 6 using the swaged part 28 of the housing 15. Specifically, it becomes possible to make it unlikely that the swaged part 28 will be opened due to the load input from the outside to the ball part 6, so that the ball part 6 can be held reliably inside the housing 15.

In particular, during manufacture of the arm member 1, the swaged part 28 is first swaged and formed while the ball part 6 is inserted in the housing 15 to hold the ball part 6 inside the housing 15, and then discontinuous fiber-reinforced resin and continuous fiber-reinforced resin are subjected to hot press forming to form the arm part body 30 and the covering part 31. This prevents the forming step of forming the arm part body 30 and the covering part 31 from being hindered by the swaging step of swaging and shaping the swaged part 28, making it possible to easily form the covering part 31 covering at least a part of the swaged part 28.

The housing 15 is configured in such a manner that the housing 15 is composed of the housing body part 17 and the plug 18 covering the housing body part 17 at one end portion side thereof, the swaged part 28 is formed at the housing body part 17 at the one end portion side, and the plug 18 is fixed to the housing body part 17 by the swaging and deformation of the swaged part 28. This prevents coming-off of the plug 18 from the housing body part 17 using the covering part 31, thereby allowing the ball part 6 to be held reliably inside the housing 15.

The covering part 31 covers at least a part of a surface of the arm part body 30 next to the swaged part 28, thereby providing the covering part 31 continuously over a range from the arm part body 30 to the swaged part 28. This makes it possible to increase the strength of the covering part 31 against load input from the outside to the ball part 6 and acting downward, namely, acting to reset the swaging and deformation of the swaged part 28. As a result, strength in holding the ball part 6 using the swaged part 28 of the housing 15 can be increased.

In the above-described embodiment, the housing 15 is not limited to the configuration composed of the housing body part 17 and the plug 18 but is further applicable in the same way to a configuration having a circular cylindrical shape with a closed bottom formed in advance and with the swaged part 28 formed by swaging and deformation at an opening part of the circular cylinder.

The arm member 1 is not limited to a member to be used in a steering device or a suspension device of a vehicle but may be used in an arbitrary device.

INDUSTRIAL APPLICABILITY

This invention is preferably used in a steering device or a suspension device of an automobile, for example.

The invention claimed is:

1. A method of manufacturing an arm member; the arm member comprising: a ball joint
having a ball-side member including a ball part, and a receiving-side member including a swaged part and holding the ball part inside the receiving-side member using deformation of the swaged part, an arm part having an arm part body made of discontinuous fiber-reinforced resin and continuous with the receiving-side member, and a covering part made of continuous fiber-reinforced resin and covering an entire surface of the swaged part,
wherein the receiving-side member further includes a cylindrical receiving-side member body part and a closing member covering the receiving-side member body part at a first end thereof, the swaged part disposed at the first end
of the receiving-side member body part and formed to fix the closing member to the receiving-side member body part, and
the covering part continually covers the entire surface of the swaged part and the closing member; the method of manufacturing comprising: a swaging step
of swaging and shaping the swaged part while the ball part is inserted in the receiving-side member to hold the ball part inside the receiving-side member, and a forming step
of performing hot press forming on the discontinuous fiber-reinforced resin and the continuous fiber-reinforced resin to form the arm part body and the covering part after the swaging step.

2. The method of manufacturing the arm member according to claim 1, wherein the covering part is disposed on a lower portion of the arm part body.

3. The method of manufacturing the arm member according to claim 1, wherein the covering part is formed into a layer shape having a smaller thickness than the arm part body.

4. The method of manufacturing the arm member according to claim 1, wherein
the covering part further covers at least a part of a surface of the arm part body next to the swaged part.

* * * * *